T. FARMER, Jr.
ELECTRIC CAR HEATER.
APPLICATION FILED JULY 5, 1913.
1,101,016.
Patented June 23, 1914.
3 SHEETS—SHEET 1.
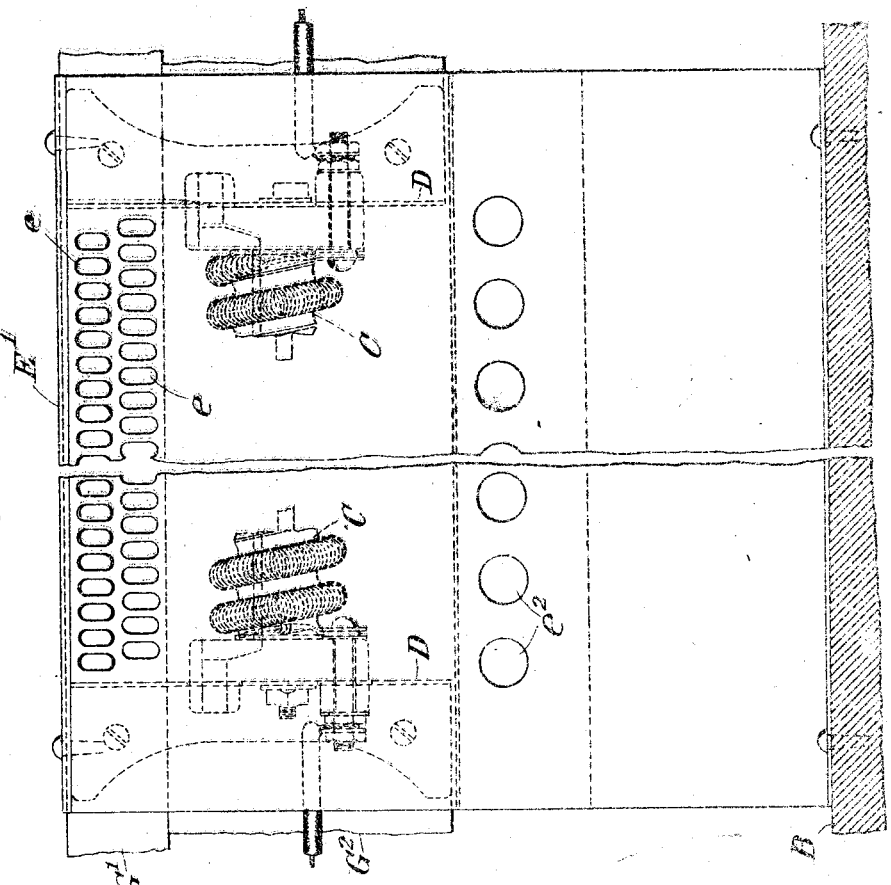
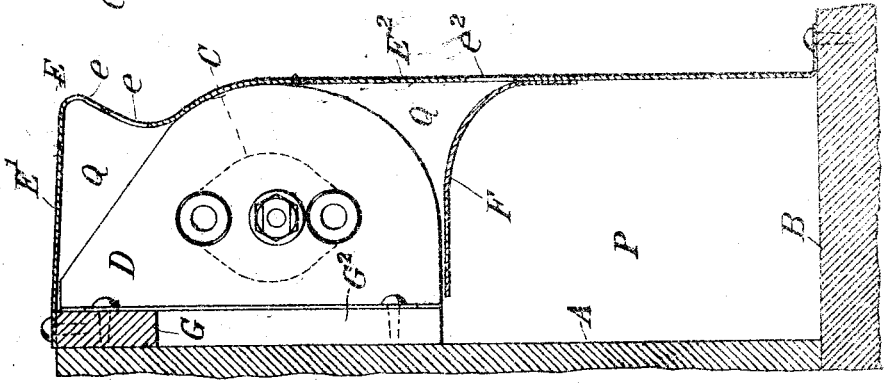
WITNESSES:
L. J. Shaw Erisman
W. C. Decker
INVENTOR
Thomas Farmer Jr.
BY
E. M. Bentley
ATTY.

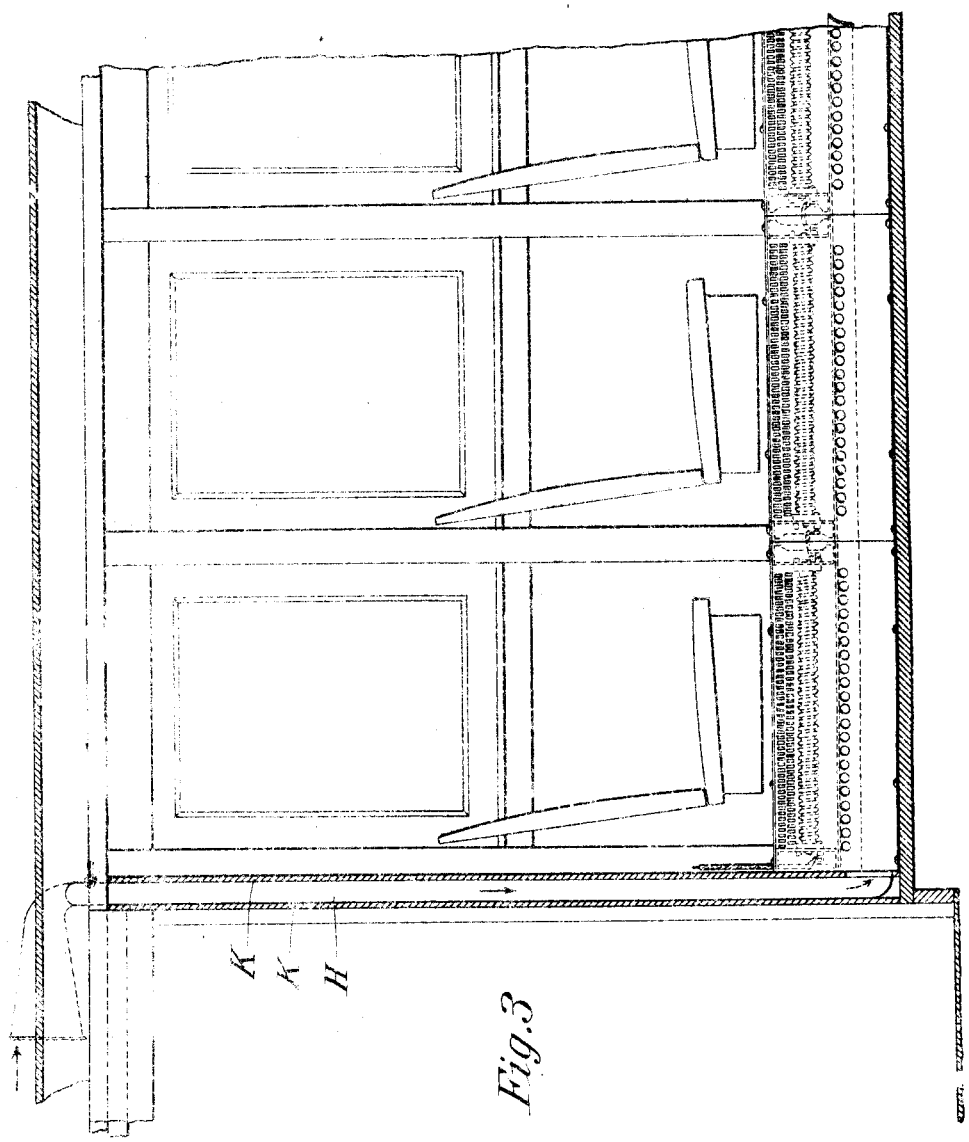

T. FARMER, Jr.
ELECTRIC CAR HEATER.
APPLICATION FILED JULY 5, 1913.
1,101,016.
Patented June 23, 1914.
3 SHEETS—SHEET 3.
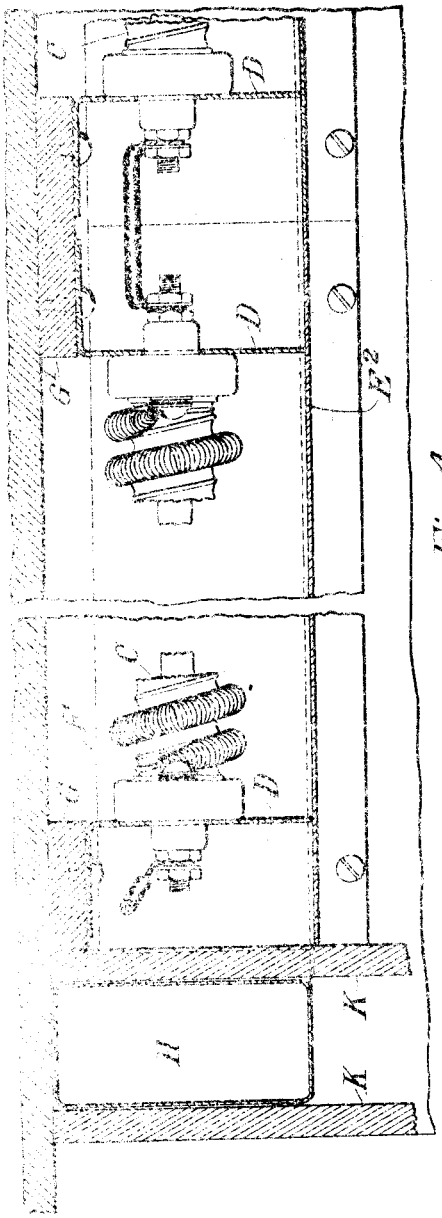
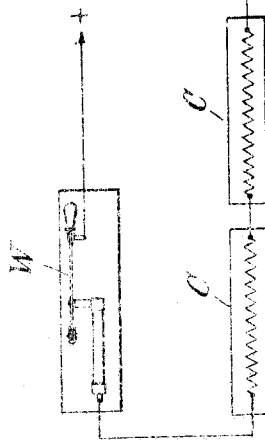
INVENTOR
Thomas Farmer Jr.
BY
E. M. Bentley
ATTY.

UNITED STATES PATENT OFFICE.

THOMAS FARMER, JR., OF NEW YORK, N. Y., ASSIGNOR TO CONSOLIDATED CAR-HEATING COMPANY, OF ALBANY, NEW YORK, A CORPORATION OF WEST VIRGINIA.

ELECTRIC CAR-HEATER.

1,101,016.  Specification of Letters Patent.  Patented June 23, 1914.

Application filed July 5, 1913. Serial No. 777,539.

*To all whom it may concern:*

Be it known that I, THOMAS FARMER, Jr., a citizen of the United States, residing at New York city, county and State of New York, have invented certain new and useful Improvements in Electric Car-Heaters, the following being a full, clear, and exact disclosure of the one form of my invention which I at present deem preferable.

For a detailed description of the present form of my invention, reference may be had to the following specification and to the accompanying drawings, which illustrate my invention, wherein—

Figure 1 is a front elevation of my car heating devices; Fig. 2 is a vertical transverse section thereof; Fig. 3 is a longitudinal section of a car showing my apparatus on one side thereof; Fig. 4 is a horizontal section through the compartments containing the heating elements, and Fig. 5 is a diagram of the electrical connections of the said elements.

My invention relates to electric car heaters and includes, fundamentally, an arrangement of ducts and heating elements wherein there is a continuous air duct extending along one side of the car adjacent to the truss plank and parallel with said duct is a series of compartments, each containing an electric heating element, the wall of each compartment being perforated to permit the outflow of heated air into the car and the compartment itself being in communication with the continuous duct. The latter serves as a receiver for the cold air to be heated and is in communication with the external atmosphere by suitable means, such as a vertical duct rising from one end of the longitudinal duct and passing upward through the car roof.

Turning to Figs. 1 and 2 of the drawing, A represents the truss plank of a car and B the floor thereof. E represents an angular two-sided casing of sheet metal, having a horizontal top portion $E^1$ and a vertical side portion $E^2$, which is placed adjacent to the truss plank and floor of the car to form therewith a rectangular chamber which is divided horizontally by a partition F into two parallel chambers or ducts one above the other. The lower duct P is continuous through the length of the car and serves as a receiver for the cold air to be heated. It is in communication with the external atmosphere by means of a vertical duct H (shown in Figs. 3 and 4) which rises up from one end thereof through the car roof, passing between the partition walls K, K, at the end of the car, and is provided at its upper end with a funnel for the intake of air. The upper duct or chamber Q is divided up by the transverse partitions D D (see Figs. 1, 2 and 4) into a series of compartments, each containing an electric heating element. The partitions D D are of sheet metal with their rear edges bent to form seating flanges which are secured to the strip G, $G^1$, $G^2$. These partitions form transverse supports between which the electric heating elements C, C, etc., are mounted, as clearly appears in Fig. 4. The aforesaid horizontal partition F does not extend clear across to the truss plank, but is stopped at a short distance therefrom to provide for the air-flow from the lower duct P into the upper duct Q, where it is heated by the aforesaid elements C and then passes out through the perforations $e$ $e$ in the walls of the upper duct into the interior of the car. Additional outlet perforations $e^2$ may also be provided in the front wall $E^2$ of the casing, if desired. The heating elements C, C will be connected in series as shown in Figs. 1 and 5 and provided with a controlling switch W. In operation the cold air will be taken in through the funnel at the top of the vertical duct H and pass thence downward to the continuous duct B, whence it will enter the individual compartments containing the several heating elements and after being heated thereby will pass into the car through the perforations $e$.

What I claim as new and desire to secure by Letters Patent is:

1. An electric car heater comprising a heating element having a standard for mounting it in a position adjacent to but separated from a vertical car wall, and an angular casing provided with a horizontal partition and forming, together with the said vertical wall and the floor of the car, an inclosure containing the said heating element in its upper part and a communicating air duct in its lower part.

2. An electric car heater comprising two parallel intercommunicating chambers along the car side, one chamber being provided with perforations opening into the car and the other communicating with the outside air, and a series of electric heaters in the said perforated chamber.

3. An electric car heater comprising an angular casing having a horizontal partition and forming, together with the side and floor of the car, two parallel intercommunicating chambers one above the other, and a series of electric heating elements contained in the upper chamber, the said upper chamber having perforations opening into the car and the lower one serving as a receiver of the cold air to be heated.

4. An electric car heater, comprising two parallel intercommunicating chambers one above the other, the lower chamber forming a continuous duct for the air to be heated and the other containing a series of electric heating elements and having perforations in its walls opening into the car.

5. An electric car heater, comprising a two-sided angular metallic plate extending along the car and forming, together with the side and floor of the car, a rectangular chamber, a horizontal partition dividing the said chamber into upper and lower intercommunicating compartments, the upper compartment having perforations opening into the car and the lower compartment containing the cold air to be heated, and a series of electric heating elements arranged longitudinally in the said upper compartment.

6. An electric car heater, comprising a continuous duct extending along the car adjacent to the car side to contain the cold air to be heated, and a series of superposed perforated chambers above the said duct but communicating therewith, and a series of electric heating elements contained in the said superposed chambers.

7. An electric car heater, comprising a continuous horizontal duct extending along the car side, a vertical duct connecting the said horizontal duct with the outer air above the car, and a series of inclosed electric heating elements above said horizontal duct, the inclosures for said elements having perforations opening into the car and being in communication with said horizontal duct.

8. An electric car heater, comprising a continuous horizontal duct extending along the car side, a vertical duct inclosed in the wall of the car and connecting the said horizontal duct with the outer air above the car, and a series of inclosed electric heating elements above said horizontal duct, the inclosures for said elements having perforations opening into the car and being in communication with said horizontal duct.

9. An electric car heater, comprising a continuous duct extending along the car side, a second parallel duct above the first one and communicating therewith, a series of transverse partitions in said second duct and dividing the same into a plurality of heating compartments, and a series of electric heating elements in the respective compartments formed by said partitions in the second duct.

In witness whereof I have hereunto set my hand, before two subscribing witnesses, this 3rd day of July, 1913.

THOMAS FARMER, Jr.

Witnesses:
   L. T. SHAW ERISMAN,
   WALLACE C. DECKER.